United States Patent
Briggs et al.

(10) Patent No.: US 7,423,982 B2
(45) Date of Patent: Sep. 9, 2008

(54) ADAPTIVE COMMUNICATION MODES

(75) Inventors: Peter G. Briggs, Norcross, GA (US); Dean P. Jagels, Dacula, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 677 days.

(21) Appl. No.: 10/237,299

(22) Filed: Sep. 9, 2002

(65) Prior Publication Data

US 2004/0047364 A1  Mar. 11, 2004

(51) Int. Cl.
    *H04L 12/66*  (2006.01)
(52) U.S. Cl. .................... 370/259; 370/395.2; 370/463; 370/465; 709/228; 725/100
(58) Field of Classification Search ............. 370/252, 370/259, 260, 261, 262, 265, 395.2, 395.21, 370/395.52, 463, 465; 709/223, 227, 228, 709/230, 237; 725/87, 91, 100, 101, 103; 375/295, 316
See application file for complete search history.

(56) References Cited

U.S. PATENT DOCUMENTS

| 4,504,831 | A | * | 3/1985 | Jahr et al. ............. 340/870.03 |
| 4,845,564 | A | * | 7/1989 | Hakamada et al. .......... 348/565 |
| 5,854,454 | A | * | 12/1998 | Upender et al. ............ 187/247 |
| 6,169,761 | B1 | * | 1/2001 | Marcoccia et al. .......... 375/132 |
| 6,396,612 | B1 | * | 5/2002 | Bjorndahl ................ 398/121 |
| 6,430,236 | B1 | * | 8/2002 | Funakoshi ................ 375/340 |
| 6,496,543 | B1 | * | 12/2002 | Zehavi .................... 375/295 |
| 6,600,908 | B1 | * | 7/2003 | Chan .................... 455/150.1 |
| 2002/0059323 | A1 | * | 5/2002 | Rodriguez et al. ............ 725/91 |
| 2002/0059623 | A1 | | 5/2002 | Rodriguez et al. ............ 725/91 |
| 2002/0143499 | A1 | * | 10/2002 | Kurosawa et al. ........... 702/188 |
| 2002/0185243 | A1 | | 12/2002 | Ellis et al. ................ 345/753 |
| 2002/0186243 | A1 | * | 12/2002 | Elis et al. ................. 345/753 |
| 2003/0007092 | A1 | * | 1/2003 | Sonner et al. .............. 348/463 |
| 2003/0088876 | A1 | * | 5/2003 | Mao et al. ................. 725/91 |
| 2003/0152024 | A1 | * | 8/2003 | Yang et al. ................ 370/216 |
| 2003/0182429 | A1 | * | 9/2003 | Jagels ..................... 709/227 |
| 2003/0224814 | A1 | * | 12/2003 | Qu et al. .................. 455/517 |
| 2006/0004661 | A1 | * | 1/2006 | Bacon ..................... 705/50 |

OTHER PUBLICATIONS

ISO/IEC 13818-6, "Information Technology—Generic Coding of Moving Pictures and Associated Audio Information—Part 6: Extensions for DSM-CC," International Organization for Standardization, Sep. 1, 1998, pp. xix-18.

* cited by examiner

*Primary Examiner*—Chi H. Pham
*Assistant Examiner*—Shick Hom

(57) ABSTRACT

Systems and methods for implementing a communication mode for a communication terminal are provided. An embodiment of a method for implementing a communication mode includes receiving a message from a remotely located network control system and implementing one of a plurality of communication modes responsive to the message.

21 Claims, 15 Drawing Sheets

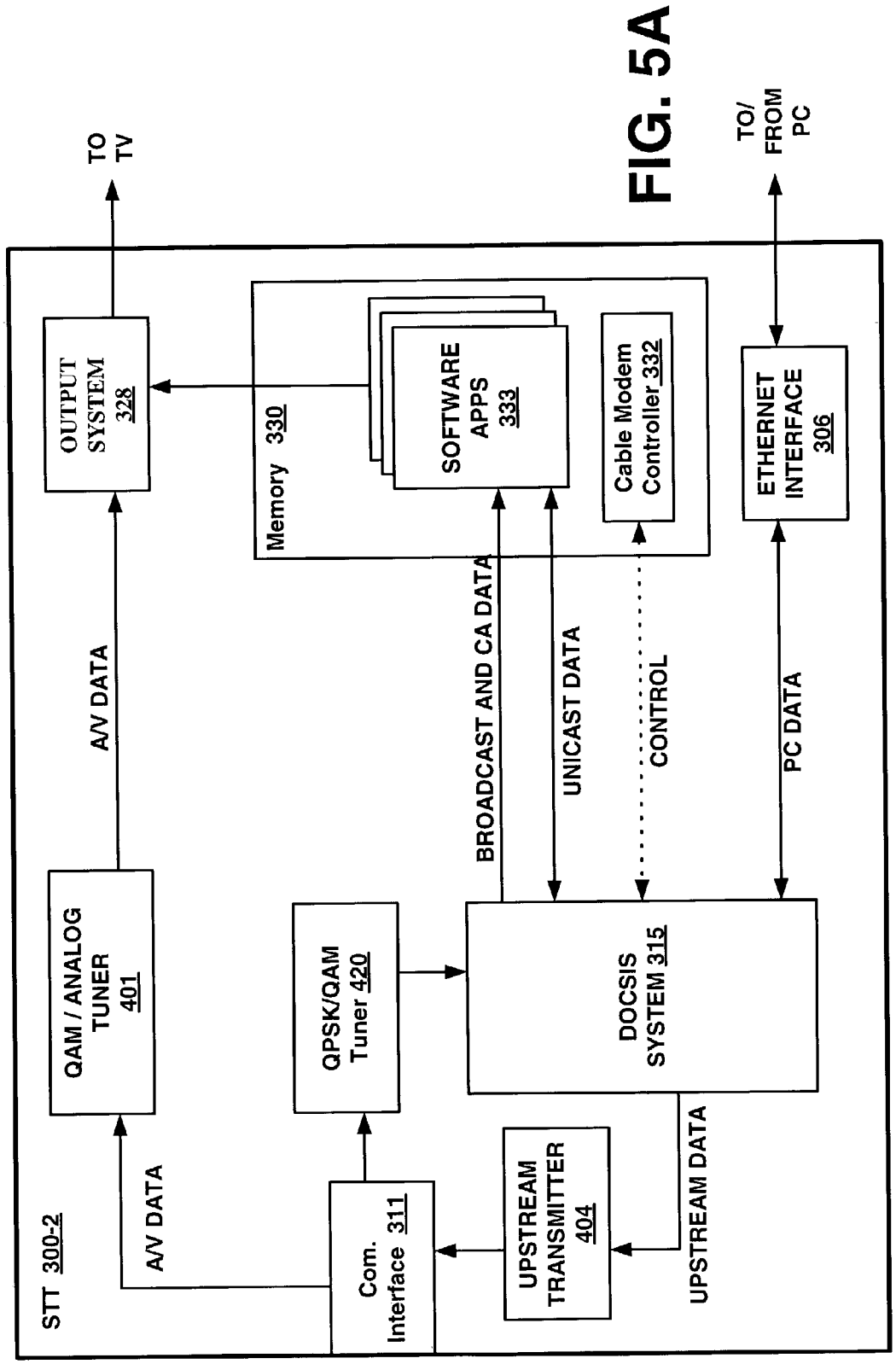

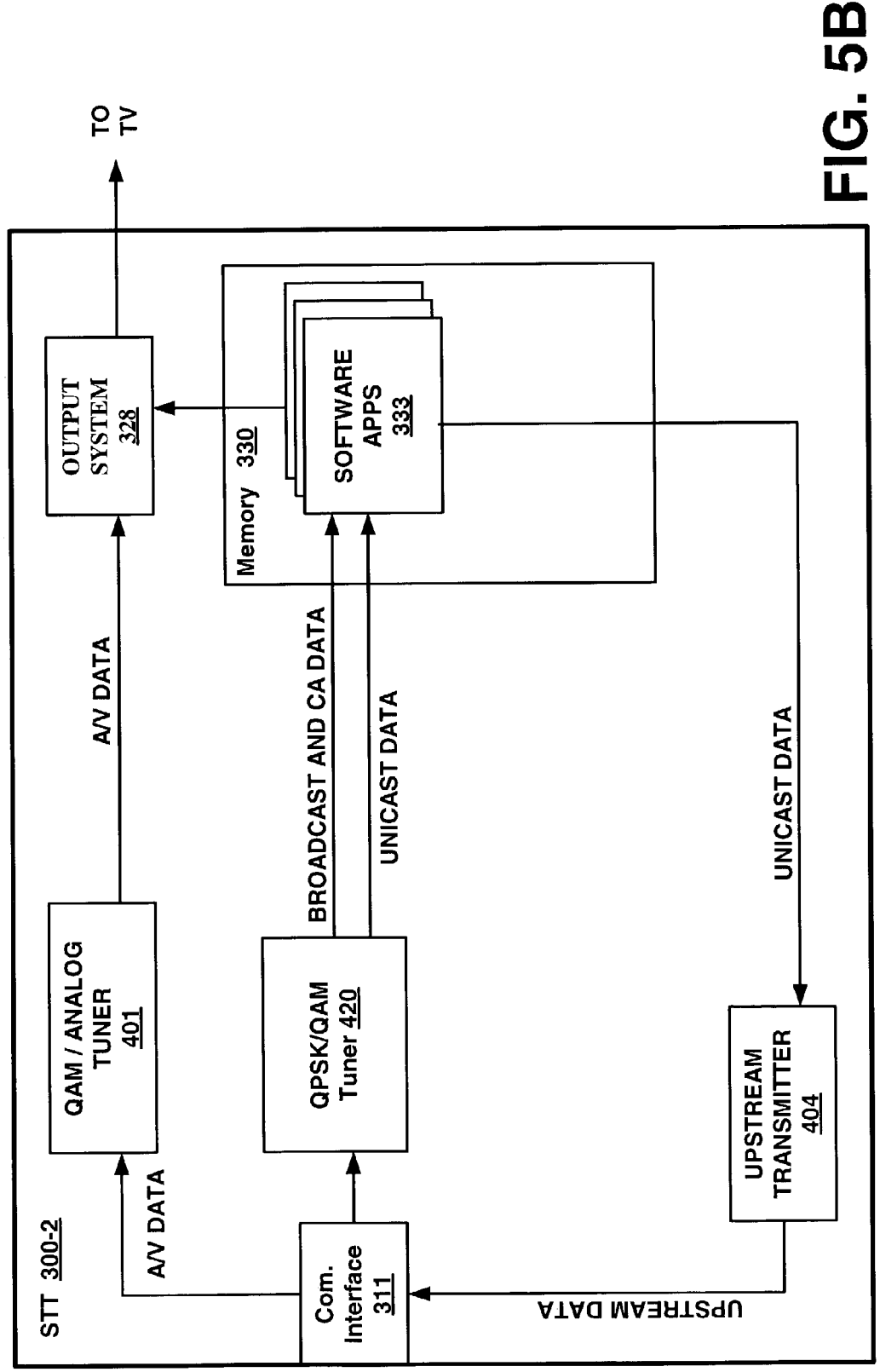

ADAPTIVE COMMUNICATION MODES

FIELD OF THE INVENTION

This invention relates in general to communication systems, and more particularly, to communication modes in communication systems.

DESCRIPTION OF THE RELATED ART

Cable television systems are now capable of providing many services in addition to analog broadcast video. In implementing enhanced programming, set-top terminals (STTs), also known as set-top boxes, have become important computing devices for accessing various video services. In addition to supporting traditional analog broadcast video functionality, many STTs now also support an increasing number of two-way digital services such as, for example, video-on-demand.

An STT is typically connected to a subscriber television network (e.g., a cable or satellite television network) and includes hardware and software necessary to provide various services and functionality. Preferably, some of the software executed by an STT is downloaded and/or updated via the subscriber television network. Each STT also typically includes a processor, communication components and memory, and is connected to a television or other display device. While many conventional STTs are stand-alone devices that are externally connected to a television, an STT and/or its functionality may be integrated into a television or other device, as will be appreciated by those of ordinary skill in the art.

An STT is typically connected to a cable or satellite television network and includes hardware and software necessary to provide various services and functionality. Some of the software executed by an STT may be downloaded and/or updated via the cable television network. In addition, an STT may also download non-A/V data that the STT uses to help provide functionality (e.g., a program guide) to a user. An STT may download software and data using, for example, a communication channel that complies with a DAVIC (Digital Audio-Visual Council) protocol. However, sometimes downloading software and/or data via a DAVIC channel may be slow or a DAVIC channel may be impaired, and, as a result, a user may experience delays or a lack of STT functionality. Therefore, there exists a need for systems and methods for addressing these and/or other problems related to STT communications.

BRIEF DESCRIPTION OF THE DRAWINGS

The invention can be better understood with reference to the following drawings. The components in the drawings are not necessarily drawn to scale, emphasis instead being placed upon clearly illustrating the principles of the present invention. In the drawings, like reference numerals designate corresponding parts throughout the several views.

FIG. 5A is a simplified block diagram illustrating data transfers between selected modules of a DAVIC/DOCSIS-capable ("D/D-capable") STT that is operating in a DOCSIS mode, according to one embodiment of the present invention.

FIG. 5B is a simplified block diagram illustrating data transfers between selected modules of a D/D-capable STT that is operating in a DAVIC mode, according to one embodiment of the present invention.

DETAILED DESCRIPTION OF PREFERRED EMBODIMENTS

Preferred embodiments of the present invention will be described below in the context of a set-top terminal (STT) that is communicatively coupled to a headend through a communications network. In one embodiment of the invention, the STT implements a communication mode that is identified by a message that the STT receives from the headend. The communication mode may involve using a certain type of communication channel to receive a certain type of data that is transmitted by the headend. Types of data that are transmitted by the headend are modulated using respective modulation schemes that are appropriate for the communication mode of the STT.

Below is a detailed description of the accompanying figures, which illustrate a preferred embodiment of the present invention: FIGS. 1-5 will provide examples of components that may be used to implement adaptive communication modes, and FIGS. 6-12 will provide examples of methods for implementing adaptive communication modes. Note, however, that the invention may be embodied in many different forms and should not be construed as limited to the embodiments set forth herein. Furthermore, all examples given herein are intended to be non-limiting, and are provided in order to help clarify the description of the invention.

Figure 1:
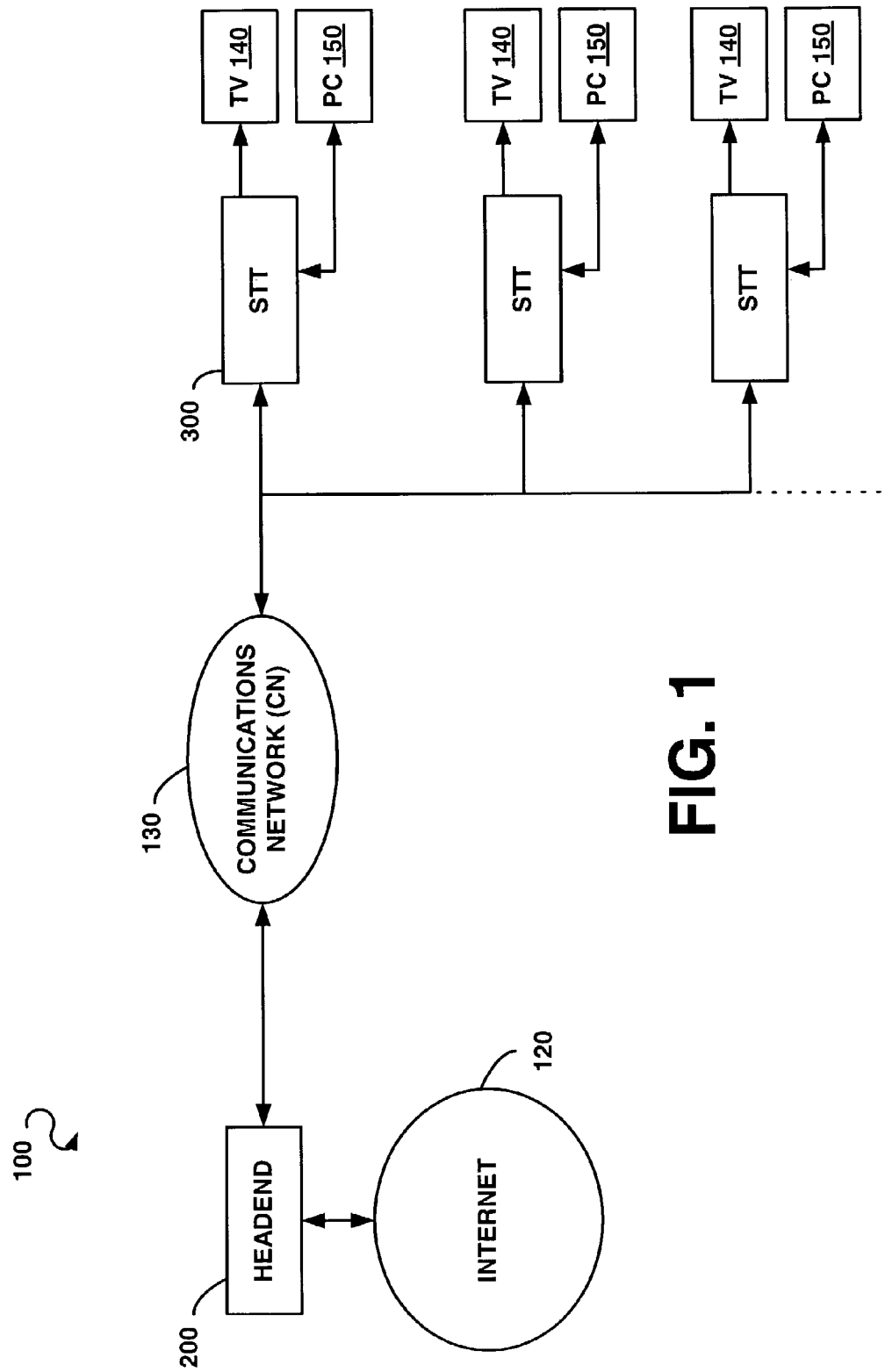
FIG. 1 is a block diagram illustrating a communications system according to one embodiment of the present invention.

FIG. 1 is a block diagram illustrating a communications system 100 according to one embodiment of the present invention. In this example, the communications system 100 includes a headend 200 and an STT 300 that are coupled via a communications network (CN) 130. The CN 130 may be (or be part of), for example, a cable television network or a satellite television network, among others. The STT 300 is typically situated at a user's residence or place of business and may be a stand-alone unit or integrated into another device such as, for example, the television 140. The STT 300 receives signals (video, audio and/or other data) from the headend 200 through the CN 130. The STT 300 may also use the CN 130 to provide upstream messages to the headend 200. The headend 200 and the STT 300 cooperate to provide a user with television services via the television 140. The STT 300 may include a cable modem (not shown in FIG. 1) that provides communications services for one or more personal computers (PC) 150, for a home network (not shown), and/or for software applications residing in the STT 300.

Figure 2:
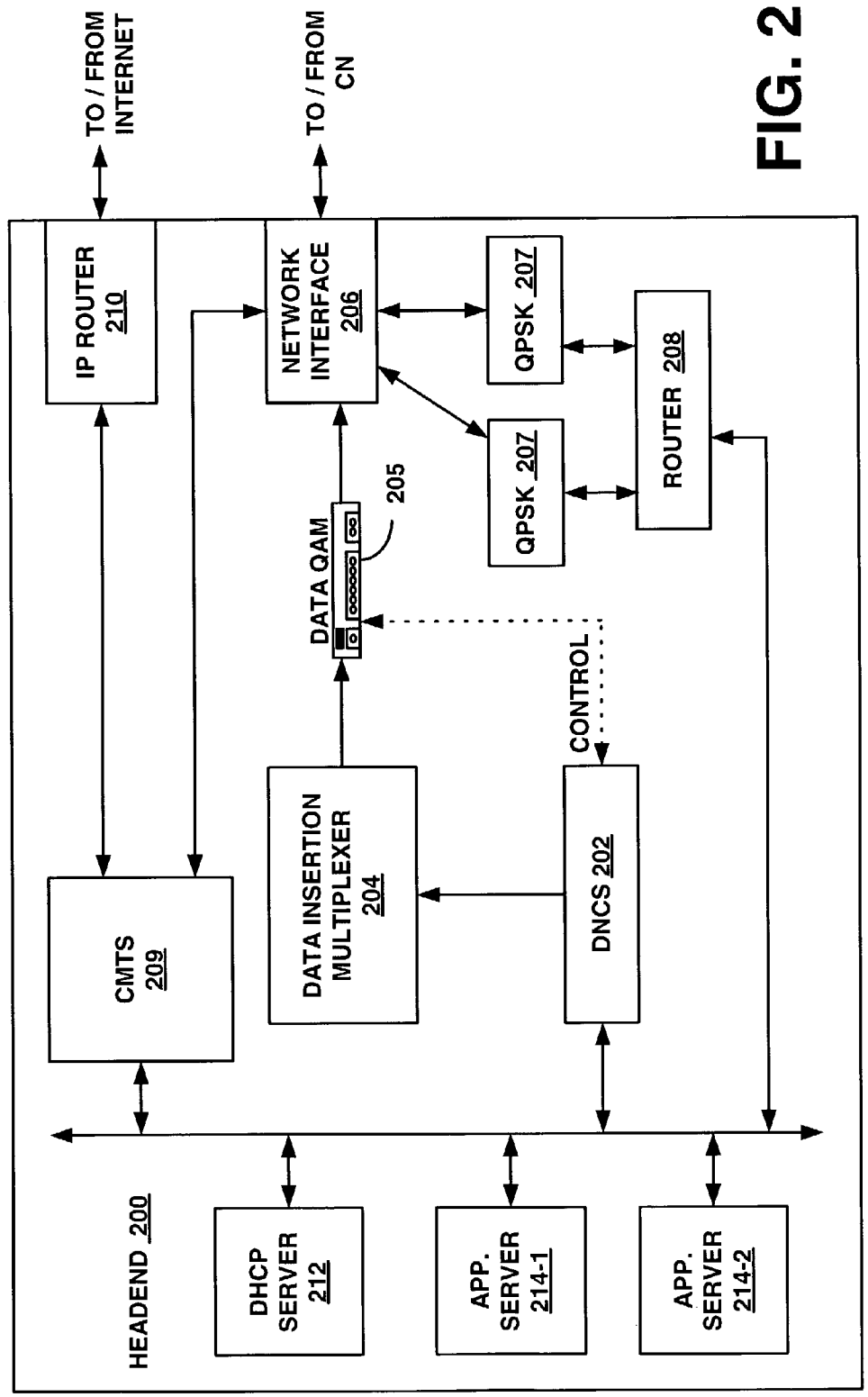
FIG. 2 is a simplified block diagram illustrating selected components of a headend according to one embodiment of the invention.

FIG. 2 is a simplified block diagram illustrating selected components of a headend 200 according to one embodiment of the invention. The headend 200 is merely illustrative and is not intended to imply any limitations upon the scope of the present invention. In an alternative embodiment, one or more of the components illustrated in FIG. 2 may reside outside the headend 200 (e.g., in another headend or in a hub that is located in the CN 130). The headend includes a plurality of application servers 214 (i.e., 214-1 and 214-2) that are responsible for providing data and/or software to STTs 300. The data and/or software that is provided by the application servers 214 may be transmitted using either a cable modem termination system (CMTS) 209, quadrature phase shift keying (QPSK) modems 207, and/or other transmission devices (not shown).

The Digital Network Control System (DNCS) 202 manages, monitors and controls the operation of STTs 300. In one embodiment, the DNCS 202 functions as a session and resource manager (SRM) of a Digital Storage Media Command and Control (DSM-CC) environment. Therefore, the DNCS 202 may control the operation of STTs 300 through UNConfigIndication messages that comply with a DSM-CC standard such as, for example, the International Organization for Standardization/International Electrotechnical Commission (ISO/IEC) 13818-6 standard, which is hereby incorporated by reference in its entirety.

According to one embodiment of the invention, a UNConfigIndication message that is transmitted by the DNCS 202 to an STT 300 is configured to include, among other things, a data communication mode identifier (DCM-ID), a DNCS IP address, and a QPSK modulator identifier (QPSK-ID). In one embodiment, a DCM-ID is included in a UNConfigIndication message so that a DOCSIS-capable STT may identify the desired STT data communication mode (DCM), and receive and/or transmit non-audio/visual data accordingly. As used herein, a DOCSIS-capable STT is an STT 300 that is capable of communicating in accordance with Data Over Cable Service Interface Specifications (DOCSIS) (e.g., DOCSIS 1.0 specifications which are hereby incorporated by reference in their entirety).

Implementing a DCM may involve communicating in accordance with one or more corresponding set(s) of communication specifications such as for example, DOCSIS specifications and/or Digital Audio Video Council (DAVIC) specifications, among others. In one embodiment, one or more of the following communication mode characteristics, among others, may be responsive to a DCM-ID that is received by the STT 300:

(1) the communication standard (e.g., DAVIC or DOCSIS, among others) that is used to receive and/or transmit certain data (e.g., broadcast and/or unicast data).

(2) the manner in which certain data transmitted and/or received by the STT 300 is modulated (e.g., QPSK or QAM, among others);

(3) the size and type of packets (e.g., ATM or Ethernet based, among others) in which certain data is received and/or transmitted by the STT 300;

(4) the transmission link (e.g., coaxial cable or telephone line, among others) that is used by the STT 300 to receive and/or transmit certain data;

(5) the type of data transmission and/or reception (e.g., connection oriented or connectionless) that is used by the STT to transmit and/or receive certain data.

The DNCS IP address may be inserted into the UNConfigIndication so that STTs operating in a DOCSIS mode or in a mixed DAVIC/DOCSIS (MDD) mode are able to unicast a UNConfigRequest message to the DNCS 202. The inclusion of the QPSK-ID in the UNConfigIndication message enables an STT 300 to identify to the DNCS 202 the out-of-band (OOB) bridge (e.g., a QPSK modem 207 or a CMTS blade (not shown)) that serves the STT 300. The identity of the OOB bridge that serves an STT 300 may be used to help determine the data communication mode for the STT 300.

In one implementation, the DNCS 202 uses a data insertion multiplexer 204 and a quadrature amplitude modulation (QAM) modulator 205 to insert in-band broadcast file system (BFS) data into an MPEG-2 transport stream that is broadcast to STTs 300. Furthermore, the DNCS may be configured to provide a user interface to allow a DNCS operator to specify a data communication mode (DCM) for a group of STTs. For example, a user interface may allow a DNCS operator to specify a DCM for STTs that are of a certain type and/or that are served by a certain OOB bridge (e.g., a QPSK modem 207).

A plurality of QPSK modems 207 are responsible for transporting out-of-band IP (internet protocol) datagram traffic between the headend 200 and a plurality of STTs. Each QPSK modem 207 typically serves a certain geographical region. Although only two QPSK modems 207 are shown in FIG. 2, more QPSK modems 207 may be used depending on the number of STTs that are being served by the headend 200. The headend router 208 is responsible for routing upstream QPSK data to respective application servers 214 that are located at the headend 200, and for routing downstream QPSK data to respective QPSK modems 207.

A CMTS 209 is responsible for providing a link between cable modems (CMs) and an upstream network (e.g., the CN 130 and/or the Internet 120 (FIG. 1)). The CMTS 209 receives an RF signal from a CM, demodulates the RF signal, and extracts Internet Protocol (IP) packets from the demodulated RF signal. The IP packets are then sent to an IP router 210 for transmission across the Internet 120, or elsewhere. When a CMTS 209 receives signals from the Internet 120 via the IP router 210, it modulates the signals for transmission across the CN 130.

A DHCP (Dynamic Host Control Protocol) server 212 supervises and distributes IP addresses to CMs and to STT customer premises equipment (CPE) contained in STTs 300 (FIG. 1). A CM contained in an SIT 300 may comprise components that are located in various areas of the STT 300. An STT CPE comprises an STT operating system (OS) and software applications that provide core STT functionality. Core STT functionality may include, for example, among others, the presentation of analog and/or digital television presentations (e.g., television channels), the presentation of interactive services (e.g., video-on-demand (VOD)), and the presentation of an interactive program guide (IPG).

Figure 3:
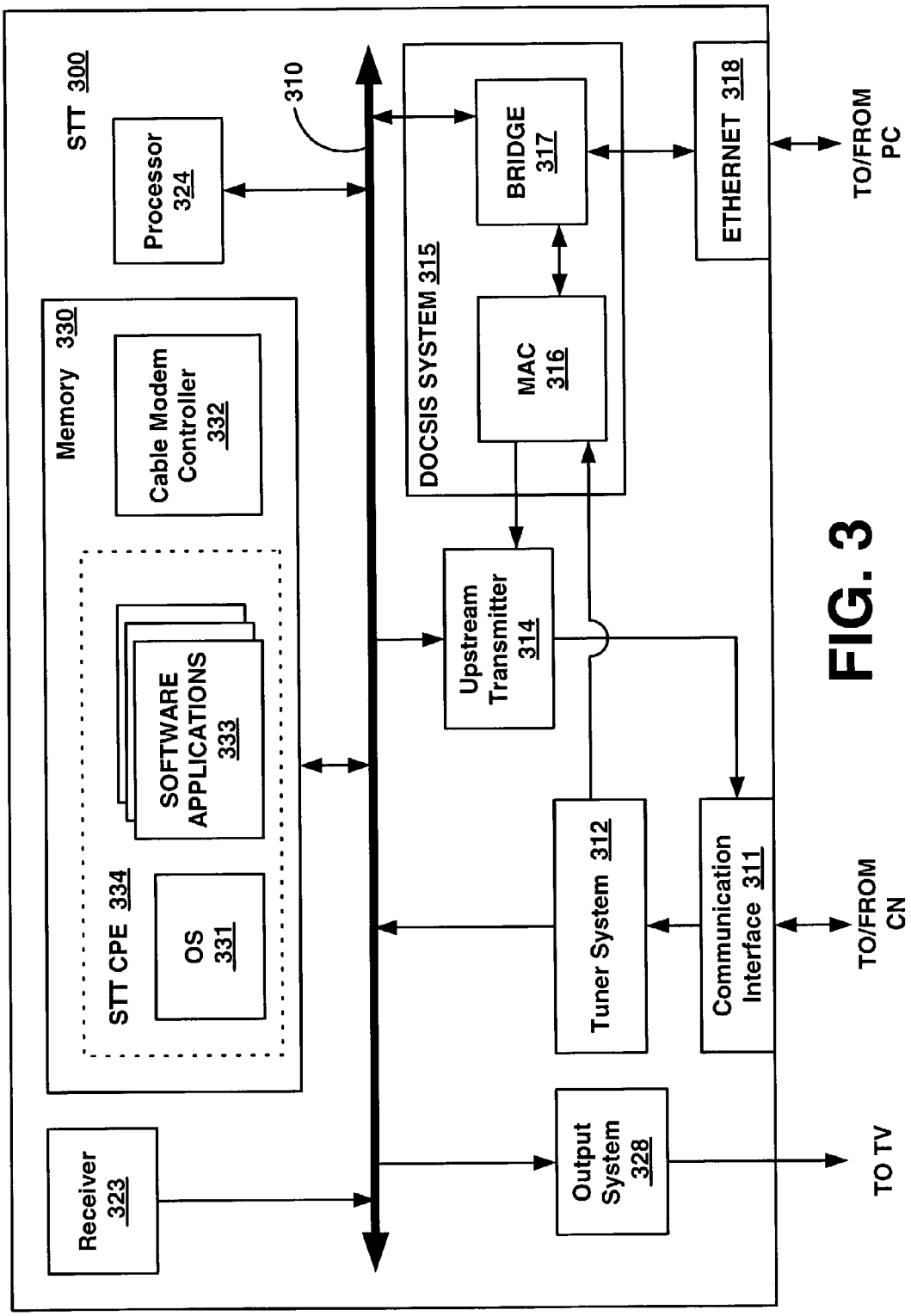
FIG. 3 is a block diagram depicting an STT according to one embodiment of the present invention

FIG. 3 is a block diagram depicting an STT 300 according to one embodiment of the present invention. The STT 300 may alternatively include additional and/or different components than the components depicted in FIG. 3. As shown in FIG. 3, the STT 300 includes the following: a communications interface 311 for receiving signals (video, audio and/or other data) from the headend 200 (FIG. 1), a tuner system 312 for extracting desired data from signals received by the communications interface 311, at least one processor 324 for controlling operations of the STT 300, an output system 328 for driving the television 140 (FIG. 1), an upstream transmitter 314 for transmitting upstream data to the headend 200, a DOCSIS system 315 for providing DOCSIS communications services, and an infra-red (IR) receiver 323 for receiving externally-generated user inputs. The processor 324, the memory 330, the output system 328, the receiver 323, and the DOCSIS system 315 are all coupled to a local interface 310. The local interface 310 may include, for example, but not limited to, one or more buses or other wired or wireless connections.

The tuner system 312 includes, in one implementation, a quadrature phase shift keying (QPSK) tuner for extracting out-of-band data and a quadrature amplitude modulation (QAM)/analog tuner for extracting audio and video data corresponding to a desired television channel. The QAM/analog tuner operates in a QAM mode to extract digital content, and operates in an analog mode to extract analog content. The tuner system 312 may be capable of demodulating, demultiplexing, and/or decoding extracted data. Alternatively, extracted data may be demodulated, demultiplexed, and/or decoded by a signal processing system (not shown) in the STT 300.

The DOCSIS system 315 includes, in one implementation, a DOCSIS MAC (media access control) component 316 and a DOCSIS bridge component 317. The DOCSIS MAC component 315 is responsible for formatting data received from the tuner system 312 and data that are forwarded to the upstream transmitter 314. The DOCSIS bridge component 317 routes data packets to their respective destinations. The DOCSIS system 315 is controlled by a cable modem controller 332, which is a software application residing in memory 330. In one embodiment, the cable modem controller 332, the DOCSIS system 315, the upstream transmitter 314, and a QAM tuner (not shown) in the tuner system 312 collectively function as a cable modem.

The processor 324 is preferably a hardware device for executing software, particularly that stored in memory 330. The processor 324 can be a custom made or commercially available processor, a central processing unit (CPU), an auxiliary processor among several processors associated with the STT 300, a semiconductor based microprocessor (in the form of a microchip or chip set), or generally any device for executing software or other instructions. Preferably, when the STT 300 is in operation, the processor 324 is configured to execute software stored within the memory 330, to communicate data to and from the memory 330, and to generally control operations of the STT 300 pursuant to the software.

The memory 330 may include any one or combination of volatile memory elements (e.g., random access memory (RAM), dynamic RAM (DRAM), static RAM (SRAM), synchronous DRAM (SDRAM), magnetic RAM (MRAM), etc.) and nonvolatile memory elements (e.g., read only memory (ROM), hard drive, tape, compact disk ROM (CD-ROM), etc.), among others. Moreover, the memory 330 may incorporate electronic, magnetic, optical, and/or other types of storage media. Note that the memory 330 can have a distributed architecture, where various components are situated remotely from one another, but can be accessed by the processor 324.

The software in memory 330 may include one or more separate programs, each of which comprises an ordered listing of executable instructions for implementing logical functions. In the example of FIG. 3, the software in the memory 330 includes an operating system (OS) 331 that controls the execution of other software, such as the cable modem controller 332 and the software applications 333. The OS 331 also provides scheduling, input-output control, file and data management, memory management, and communication control and related services. The software applications 333 and the OS 331, which provide core STT functionality, are part of what is termed "STT CPE" 334. In a preferred implementation, the STT CPE 334 uses an RF MAC address whereas the DOCSIS system 315 uses an Ethernet MAC address. The RF MAC address and the Ethernet MAC address may be assigned to the STT at the time that the STT is manufactured.

An STT 300 can receive broadcast STT data over either a DAVIC or a DOCSIS channel. When the STT 300 is powered up, it may search the DAVIC QPSK forward path spectrum (70-130 MHz) and the DOCSIS QAM forward path spectrum (88-870 MHz) until the STT 300 locates broadcast STT data. The STT 300 can then find a UNConfigIndication message in the broadcast STT data and can examine the DCM-ID (data communication mode identifier) contained in such message to determine the desired communication mode.

A DCM-ID (e.g., in the form of a numeral) that is contained in a UNConfigIndication message may identify one of a plurality of communication modes. A communication mode may be, for example, DAVIC, DOCSIS, or mixed DAVIC/DOCSIS (MDD), among others. When an STT 300 receives a DAVIC DCM-ID, then the STT CPE 334 of the STT 300 uses a DAVIC channel (i.e., a communication channel that carries data transmitted in accordance with DAVIC specifications) for receiving out-of-band (OOB) broadcast data and conditional access (CA) data (hereinafter collectively referred to as "broadcast and CA data"), and the STT 300 attempts to establish an interactive DAVIC connection that can be used by the STT CPE 334 to receive and transmit unicast data. The CA data may include, for example, among others, global broadcast authentication messages (GBAMs) and/or entitlement management messages (EMMs). The OOB broadcast data comprises non audio and/or video (A/V) data that are broadcast to STTs 300. The OOB broadcast data may be used by the STTs 300 to help provide STT functionality to a user, and may include, for example, among others, schedules of television services that are to be broadcast to the STTs 300. The schedules for television services may be presented to a user by an STT 300 as part of an interactive program guide (IPG) presentation. The OOB broadcast data may also include, for example, UNConfigIndication messages, UNDownload messages, and/or UNPassthru messages that comply with a DSM-CC standard. Unicast data, on the other hand, are data that are unicast to or from a single STT, and may include, for example, among others, unicast UNPassthru messages from the DNCS 202 to an STT. In one embodiment, among others, the STT 300 may receive and/or transmit data that are formatted and modulated in accordance with the DAVIC 1.2 specifications (which are hereby incorporated by reference in their entirety) in response to the STT 300 receiving a DAVIC DCM-ID.

When an STT 300 receives a DOCSIS DCM-ID, then the STT 300 attempts to establish an interactive DOCSIS connection that can be used by the STT CPE 334 to receive unicast, broadcast and CA data, and to transmit unicast data. When an STT 300 receives an MDD DCM-ID, then the STT CPE 334 of the STT 300 uses a DAVIC channel for receiving broadcast and CA data, and the STT 300 attempts to establish an interactive DOCSIS connection that can be used by the STT CPE 334 to receive and transmit unicast data. In one embodiment, among others, the STT 300 may receive and/or transmit data that are formatted and modulated in accordance with the DOCSIS 1.0 specifications (which are hereby incorporated by reference in their entirety) in response to the STT 300 receiving a DOCSIS DCM-ID.

A DCM-ID may be broadcast to an OOB bridge's subnet of STTs as part of the UNConfigIndication message. In one embodiment, only DOCSIS-capable STTs are responsive to the DCM-ID; non-DOCSIS-capable STTs may ignore the DCM-ID and may simply operate in DAVIC mode.

The DNCS 202 may periodically broadcast a UNConfigIndication message to the STT subnet of each QPSK modem 207. The UNConfigIndication message may include the IP address of the DNCS 202, a DCM-ID, and the ID of the QPSK modem 207 to which the message is delivered. Note that the periodicity of the UNConfigIndication message has an impact on STT boot time, and therefore should not be arbitrarily large. To help ensure that the boot process does not time out, and to keep subscribers from waiting any longer than necessary, the UNConfigIndication message is preferably transmitted at least once every 60 seconds.

The absence of a DCM-ID in the UNConfigIndication message is preferably interpreted by an STT 300 as a request for a DAVIC mode. Furthermore, conflicting DCM-IDs that are received by an STT 300 on different OOB communication paths prior to establishing an interactive connection may be interpreted by the STT 300 as a request for a DOCSIS DCM.

A change in the DCM-ID that is received by an STT 300 after it has successfully established an interactive connection is preferably ignored, unless a "DCM-update" message is received prior to receiving the new DCM-ID. A DCM-update message may be, for example, among others, a UNConfigIndication message that has a reason code configured to communicate that a change in DCM is desired in response to a subsequent UNConfigIndication message identifying a DCM. Upon receiving a DCM-update message from the DNCS 202, the STT 300 may attempt to establish an interactive connection based on the DCM-ID in the next UNConfigIndication message that is received, if such DCM-ID identifies a different DCM than the currently implemented DCM. However, if a "DCM-update" message is not received after an interactive connection has been established, then when the STT 300 receives a DCM-ID (e.g., as part of a UNConfigIndication message), the STT 300 does not terminate an existing interactive connection nor does it attempt to establish a new interactive connection, regardless of whether the received DCM-ID is inconsistent with the currently implemented DCM.

The DCM-update message may therefore be used to regulate the number of STTs 300 that are using a certain DCM. For example, if a gradual switch to a DCM is desired for a group of STTs 300, then a DCM-update message is not transmitted to the group of STTs 300 prior to a change in the DCM-ID that is included in UNConfigIndication messages. As a result, the group of STTs 300 gradually adopts (e.g., as each STT 300 reboots) a new DCM that is identified by the new DCM-ID. A gradual adoption of a DCM may be desired so that one or more headend devices (e.g., the STT server 212) involved in establishing interactive connections are not overwhelmed as a large number of STTs 300 attempt to simultaneously establish interactive connections by communicating with the headend devices.

When an STT 300 reboots, it may attempt to establish an interactive connection using the DCM and parameters that the STT 300 most recently used to establish a successful connection. This may be in the interest of minimizing boot time by not requiring the STT 300 to wait for a UNConfigIndication message. Also, the expectation may be that the vast majority of the time, when an STT 300 reboots, it may be in the same physical location.

If the STT 300 attempts to establish an interactive connection with its last successful communication parameters but fails, it may search the DAVIC and DOCSIS spectrums for a UNConfigIndication message containing a current DCM-ID. Until a UNConfigIndication message is found, the STT 300 may periodically try to establish an interactive connection using the most recently successful communication parameters. After each predetermined time period (e.g., 60 seconds) of unsuccessfully locating broadcast STT data, the STT 300 may make another attempt to establish an interactive connection using the most recently successful parameters.

If an STT 300 establishes an interactive connection prior to receiving a new UNConfigIndication message and then determines that a new DCM-ID specified in the new UNConfigIndication message is inconsistent with the STT 300's current DCM (e.g., DAVIC, DOCSIS, or MDD), then the STT 300 may disconnect the existing interactive connection and establish an interactive connection based on the new DCM-ID. Furthermore, if the STT 300 has not successfully established a first DCM, and the STT 300 receives a UNConfigIndication message which identifies a second DCM that is different from the first DCM, then the STT 300 preferably establishes the second DCM.

In one embodiment, if an STT 300 is unable to establish or maintain a DCM specified by a DCM-ID received from the DNCS 202, then the STT 300 may temporarily communicate or receive data in a manner that is inconsistent with the DCM-ID until the STT 300 is able to establish (or re-establish) the DCM specified by the DCM-ID. For example, if the STT 300 receives a DOCSIS DCM-ID (e.g., after a power cycle reset or after receiving a DCM-update message) or if the STT 300 is operating in a DOCSIS DCM, and if the DOCSIS channel is impaired or becomes impaired, then the STT 300 may receive broadcast and CA data over the DAVIC channel for the duration that the DOCSIS channel is impaired.

As another example, if the STT 300 receives a DAVIC DCM-ID or an MDD DCM-ID (or is operating in a DAVIC DCM or an MDD DCM), and if the DAVIC channel is impaired or becomes impaired, then the STT 300 may receive broadcast and CA data encapsulated in Ethernet frames over the DOCSIS channel for the duration that DAVIC channel is impaired. In this manner, STT services or functionality provided to a user are not significantly interrupted when a communications channel for receiving broadcast and CA data is impaired.

According to one embodiment, if an STT 300 no longer finds broadcast and CA data on a first type of channel (e.g., DAVIC), but if the first type of channel is not otherwise impaired, then the STT 300 may temporarily receive broadcast and CA data over a second type of channel (e.g., DOCSIS) until broadcast and CA data is found on the first type of channel.

Figure 4A:
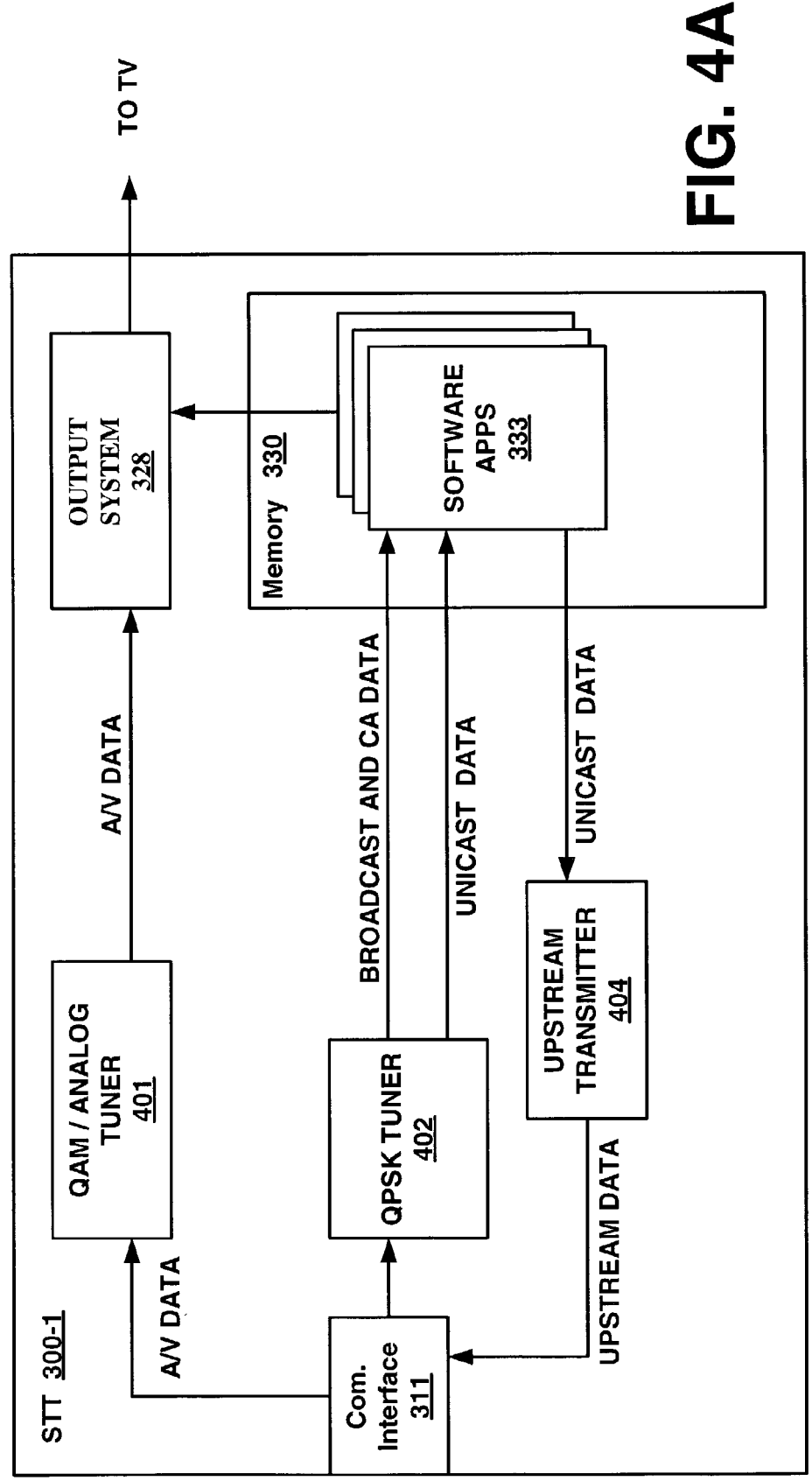
FIG. 4A is a simplified block diagram illustrating data transfers between selected modules of a mixed DOCSIS/DAVIC-capable ("MDD-capable") STT that is operating in a DAVIC mode, according to one embodiment of the present invention.

FIG. 4A is a simplified block diagram illustrating data transfers between selected modules of a mixed DOCSIS/DAVIC-capable ("MDD-capable") STT 300-1 that is operating in a DAVIC mode, according to one embodiment of the present invention. An MDD-capable STT 300-1 is an STT that is capable of utilizing a DAVIC channel for receiving broadcast and CA data while simultaneously utilizing a DOCSIS channel for receiving and transmitting unicast data. Although an MDD-capable STT 300-1 is capable of using a DOCSIS channel for receiving and transmitting unicast data, it may alternatively use a DAVIC channel for receiving and transmitting unicast data, depending on a desired communication mode. According to one embodiment, an MDD-capable STT 300-1 that is operating in DAVIC mode uses a DAVIC channel for receiving broadcast and CA data, and establishes an interactive DAVIC connection for receiving and transmitting unicast data.

The STT 300-1 includes, among other components, a QPSK/QAM upstream transmitter 404 and three tuners: a QAM/analog tuner 401, a QPSK tuner 402, and a QAM tuner 403. The QPSK/QAM upstream transmitter 404 is used for transmitting upstream data to the headend 200 using either a QPSK or a QAM modulation scheme, depending, for example, on a desired communication mode. Although not illustrated in FIG. 4A, data that are extracted by each of the tuners 401-403 may be demodulated, demultiplexed, decoded, and/or buffered as necessary by one or more STT components (not shown). The QAM/analog tuner 401 extracts in-band analog and digital A/V data from QAM and analog broadcasts that are received by the communications interface 311 from the headend 200 (FIG. 1). The extracted A/V data are then processed (e.g., demodulated, decoded, etc.) and forwarded to the output system 328. The A/V data are then converted by the output system 328 into analog signals having a suitable format. The analog signals are then output by the output system 328 to a display device, such as, for example, the television 140 (FIG. 1).

The QPSK tuner 402 extracts broadcast and CA data and unicast data from QPSK streams received by the communications interface 311 from the headend 200. The broadcast and CA data and unicast data that are extracted by the QPSK tuner 402 are processed (e.g., demodulated) by other STT component(s) (not shown) and then forwarded to memory 330 from where they may be retrieved and used by software applications 333.

Note that in order to simplify the description of the preferred embodiments, the data flows that are depicted in FIGS. 4A-5B may be handled, processed, and/or buffered by components that are not shown in the respective figures. Furthermore, the data flows that are depicted in FIGS. 4A-5B may take a less direct path than shown in the respective figures. For example, the broadcast and CA data may be provided to one of the software applications 333 by first being stored in memory 330 (FIG. 3) and by then being retrieved and used by a software application as needed.

Figure 4B:
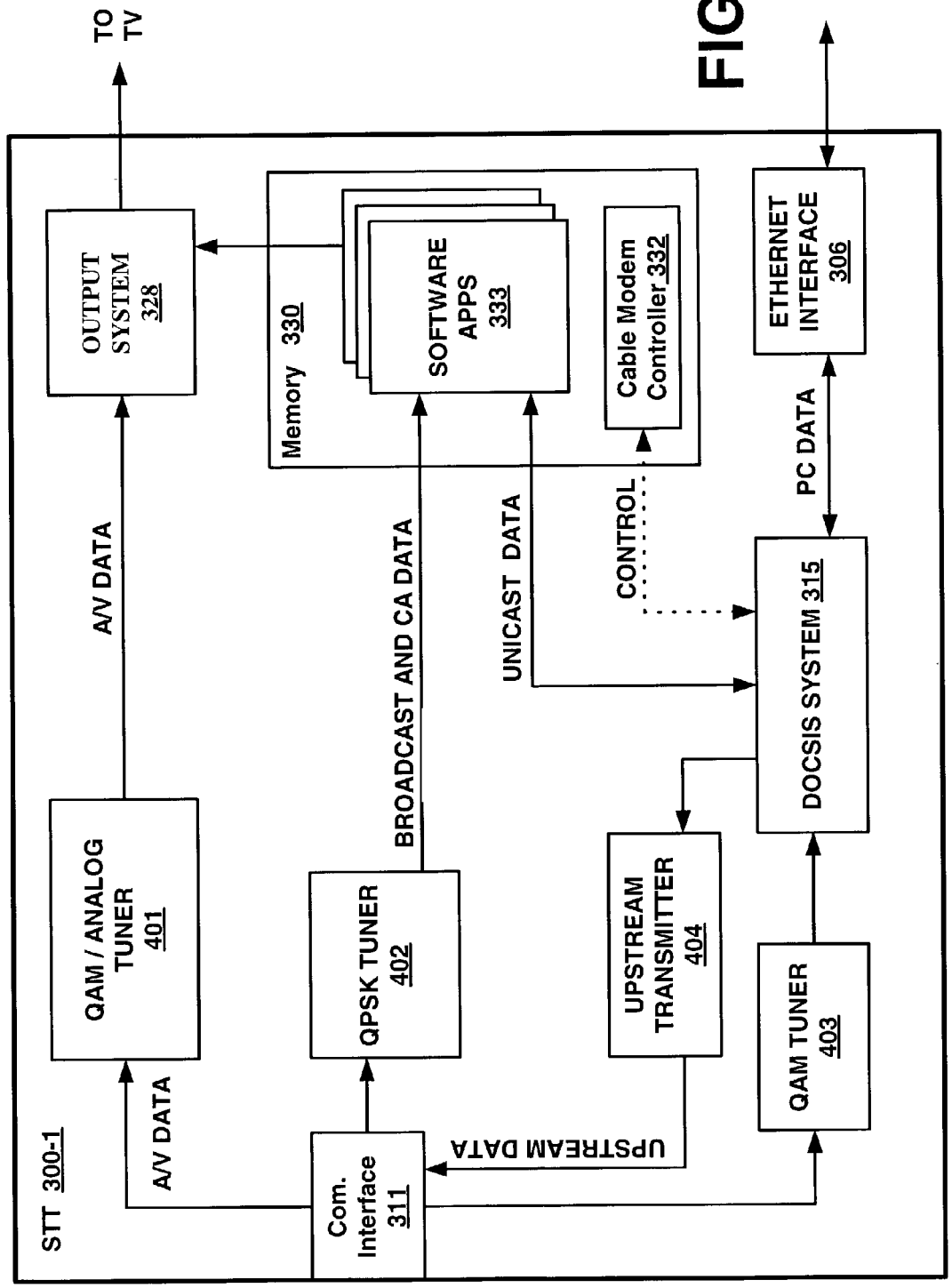
FIG. 4B is a simplified block diagram illustrating data transfers between selected modules of an MDD-capable STT that is operating in an MDD mode, according to one embodiment of the present invention.

FIG. 4B is a simplified block diagram illustrating data transfers between selected modules of an MDD-capable STT 300-1 that is operating in an MDD mode, according to one embodiment of the present invention. According to one embodiment, an MDD-capable STT 300-1 that is operating in an MDD mode uses a DAVIC channel for receiving broadcast and CA data, and establishes an interactive DOCSIS connection for receiving and transmitting unicast data.

The QPSK tuner 402 extracts broadcast and CA data from QPSK broadcast streams received by the communications interface 311 from the headend 200. The broadcast and CA data that are extracted by the QPSK tuner 402 are processed (e.g., demodulated) by other STT component(s) (not shown) and then forwarded to memory 330 from where they may be retrieved and used by software applications 333.

The QAM tuner 403 extracts unicast data from QAM streams received by the communications interface 311. The unicast data that are extracted by the QAM tuner 403 are forwarded to the DOCSIS system 315, which in turn forwards the unicast data to memory 330 from where they may be retrieved and used by software applications 333. The DOCSIS system 315 also receives unicast data from software applications and forwards the unicast data to the QPSK/QAM upstream transmitter 404, which transmits the unicast data to the headend 200.

The QAM tuner 403 also extracts personal computer (PC) data from QAM broadcast streams received by the communications interface 311. As used herein, PC data are data that are transmitted to or from a PC. The PC data that are extracted by the QAM tuner 403 are forwarded to the DOCSIS system 315, which then forwards the data to a PC 150 (FIG. 1) via an Ethernet interface 306.

Figure 4C:
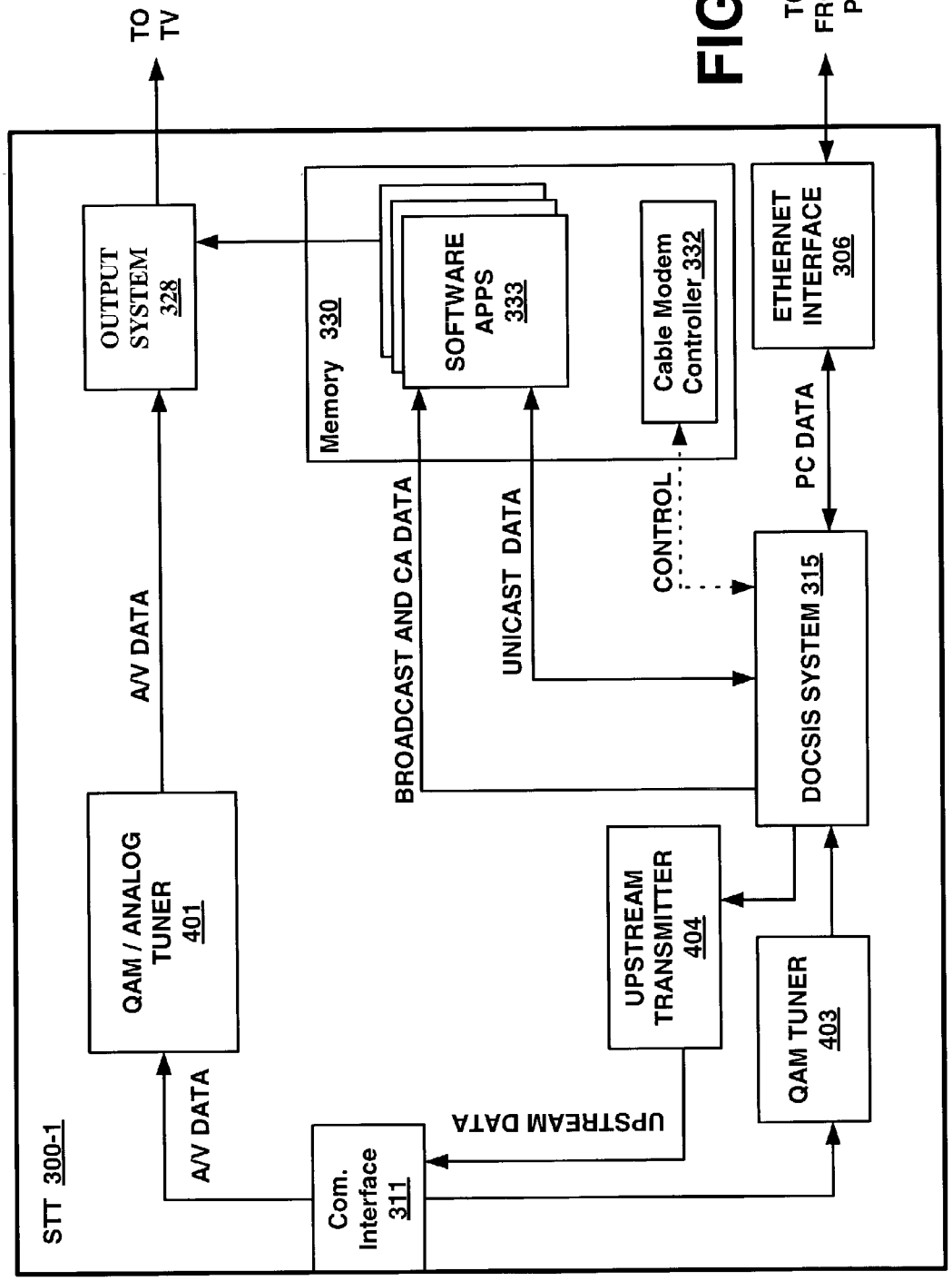
FIG. 4C is a simplified block diagram illustrating data transfers between selected modules of an MDD-capable STT that is operating in a DOCSIS mode, according to one embodiment of the present invention.

FIG. 4C is a simplified block diagram illustrating data transfers between selected modules of an MDD-capable STT 300-1 that is operating in a DOCSIS mode, according to one embodiment of the present invention. According to one embodiment, an MDD-capable STT 300-1 that is operating in a DOCSIS mode establishes an interactive DOCSIS connection for receiving broadcast and CA data and for receiving and transmitting unicast data.

The QAM tuner 403 extracts unicast data as well as broadcast and CA data from QAM streams received by the communications interface 311, and forwards the data to the DOCSIS system 315. The DOCSIS system 315 forwards the data to memory 330 from where the data may be retrieved and used by software applications 333. The DOCSIS system 315 also receives unicast data from software applications 333 and forwards the unicast data to the QPSK/QAM upstream transmitter 404, which transmits the unicast data to the headend 200.

FIG. 5A is a simplified block diagram illustrating data transfers between selected modules of a DAVIC/DOCSIS-capable ("D/D-capable") STT 300-2 that is operating in a DOCSIS mode, according to one embodiment of the present invention. A D/D-capable STT 300-2 is an STT that is capable of utilizing a DAVIC channel or a DOCSIS channel (but not both simultaneously) for receiving unicast, broadcast, and CA data. According to one embodiment, a D/D-capable STT 300-2 that is operating in a DOCSIS mode establishes an interactive DOCSIS connection for receiving broadcast and CA data and for receiving and transmitting unicast data. The STT 300-2 includes a QPSK/QAM tuner 420 that is capable of receiving data that is modulated using QPSK or QAM.

In the embodiment depicted in FIG. 5A, the QPSK/QAM tuner 420 extracts unicast data as well as broadcast and CA data from QAM streams received by the communications interface 311, and forwards the data to the DOCSIS system 315. The DOCSIS system 315 forwards the data to memory 330 from where the data may be retrieved and used by software applications 333. The DOCSIS system 315 also receives unicast data from software applications 333 and forwards the unicast data to the QPSK/QAM upstream transmitter 404, which transmits the unicast data to the headend 200 using QAM or QPSK signals.

FIG. 5B is a simplified block diagram illustrating data transfers between selected modules of a D/D-capable STT 300-2 that is operating in a DAVIC mode, according to one embodiment of the present invention. According to one embodiment, a D/D-capable STT 300-2 that is operating in a DAVIC mode uses a DAVIC channel for receiving broadcast and CA data and for transmitting and receiving unicast data.

In the embodiment depicted in FIG. 5B, the QPSK/QAM tuner 420 extracts unicast data as well as broadcast and CA data from QPSK streams received by the communications interface 311, and forwards the data to memory 330 from where the data may be retrieved and used by software applications 333. The QPSK/QAM upstream transmitter 404 receives unicast data from software applications 333 transmits the unicast data to the headend 200 using QPSK signals.

Figure 6:
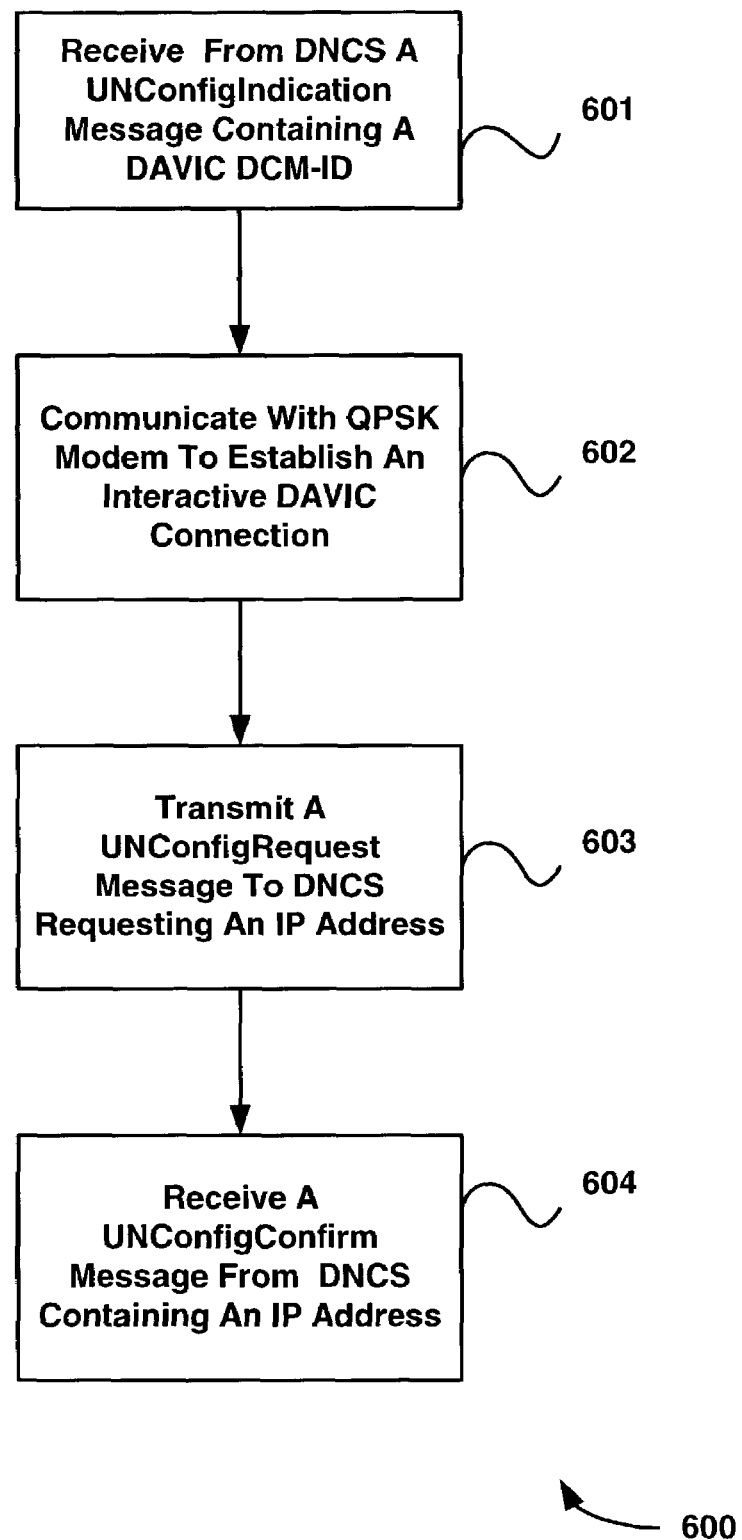
FIG. 6 is a flow chart illustrating a method for initializing an STT in a DAVIC data communication mode, according to one embodiment of the present invention.

FIG. 6 is a flow chart illustrating a method 600 for initializing an STT 300 (FIG. 1) such that the STT 300 is capable of operating in a DAVIC mode, according to one embodiment of the present invention. The STT 300 is capable of communicating using a DOCSIS channel and may be, for example, an MDD-capable STT 300-1 (FIG. 4A) or a D/D-capable STT 300-2 (FIG. 5A). As shown in step 601, the STT 300 receives from the DNCS 202 a UNConfigIndication message containing a DAVIC DCM-ID. The STT 300 may locate the UNConfigIndication message by searching available communication channels. In response to receiving the DAVIC DCM-ID, the STT 300 communicates with a QPSK modem 207 to establish an interactive DAVIC connection, as indicated in step 602. Then the STT 300 transmits a UNConfigRequest message to the DNCS 202 requesting an IP address, as indicated in step 603. Finally, in step 604, the STT 300 receives a UNConfigConfirm message from the DNCS 202 containing an IP address that is to be used by the DNCS 202 to transmit unicast data to the STT 300.

Figure 7:
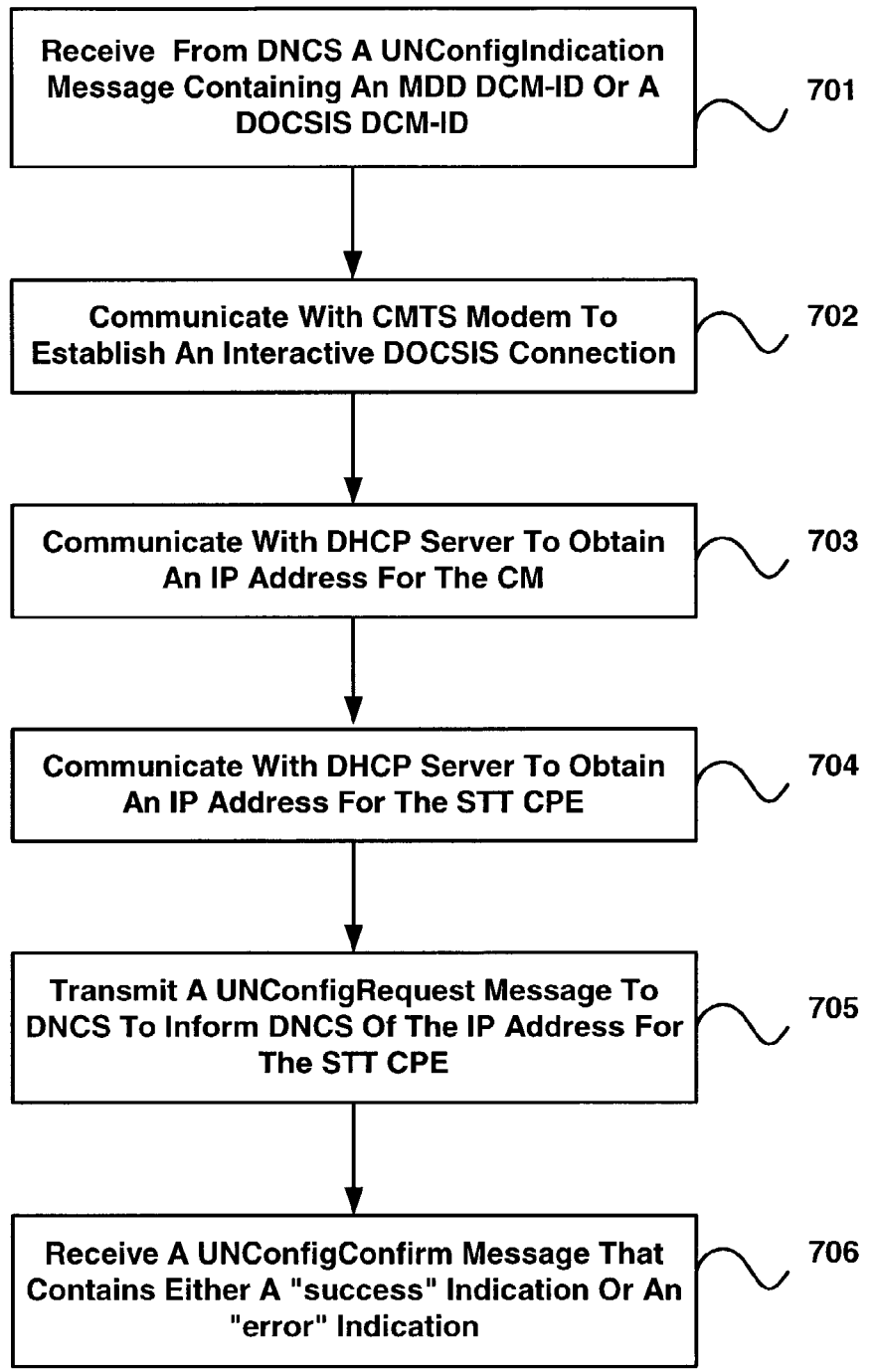
FIG. 7 is a flow chart illustrating a method for initializing an STT in an MDD or a DOCSIS data communication mode, according to one embodiment of the present invention.

FIG. 7 is a flow chart illustrating a method 700 for initializing an STT 300 (FIG. 1) such that the STT 300 is capable of operating in a DOCSIS mode, according to one embodiment of the present invention. It should be noted that the method 700 may also be used to initialize an STT 300 such that the STT 300 is capable of operating in an MDD mode. As shown in step 701, the STT 300 receives from the DNCS 202 a UNConfigIndication message containing either an MDD DCM-ID or a DOCSIS DCM-ID. In response to receiving the UNConfigIndication message, the STT communicates with the CMTS 209 (FIG. 2) to establish an interactive DOCSIS connection, as indicated in step 702. The STT 300 then communicates with the DHCP server 212 (FIG. 2) to obtain an IP address for the cable modem within the STT 300, as indicated in step 703. The STT 300 also communicates with the DHCP server 212 to obtain an IP address for the STT CPE 334, as indicated in step 704.

After obtaining an STT CPE IP address, the STT 300 transmits a UNConfigRequest message to the DNCS 202 to inform the DNCS 202 of the STT CPE IP address, as indicated in step 705. An STT 300 may also include its STT CPE MAC address, QPSK modulator ID, and DCM-ID in the UNConfigRequest message.

Finally, in step 706, the STT 300 receives a UNConfigConfirm message from the DNCS 202 that contains either a "success" indication or an "error" indication. A success indication permits the STT 300 to use the IP address for the STT CPE, whereas an error indication denies the STT 300 permission to use the IP address for the STT CPE.

If in step 705 the DNCS 202 receives a UNConfigRequest message containing an STT CPE IP address which has been previously assigned to a DOCSIS-capable STT and the administrative status of the STT 300 sending the UNConfigRequest message is 'In Service Two-Way' (i.e., if the STT 300 is authorized to establish an interactive connection, as determined by, for example, a system operator), then the DNCS 202 may dissociate the IP address from the DOCSIS-capable STT to which the IP address previously was assigned. The DNCS 202 may then assign such IP address to the STT 300 sending the UNConfigRequest message and use the IP address for unicast communication with the STT 300. The DNCS 202 may also store the QPSK modulator ID contained within the UNConfigRequest message in the STT 300's database record. The DNCS 202 may then send a UNConfigConfirm message in step 706 with a 'success' code to the STT 300. Note that when the DNCS 202 dissociates an IP address from an STT, a date and time-stamped error message is preferably logged containing the MAC address of the STT whose IP address has been deleted and the MAC address of the STT 300 that is being assigned the IP address.

If in step 705 the DNCS 202 receives a UNConfigRequest message containing an STT CPE IP address which has been previously assigned to a non-DOCSIS-capable STT (an STT that is not capable of communicating using DOCSIS) and the administrative status of the STT 300 sending the UNConfigRequest message is 'In Service Two-Way,' the DNCS 202 does not dissociate the IP address from the non-DOCSIS-capable STT, and does not store the QPSK modulator ID contained within the UNConfigRequest message. The DNCS 202 then sends a UNConfigConfirm message in step 706 with an 'error' code to the STT 300.

If in step 705 the DNCS 202 receives a UNConfigRequest message containing an STT CPE IP address from an STT 300 having an administrative status that is not 'In Service Two-Way,' then the DNCS 202 may deliver a UNConfigConfirm message with an 'error' response to such STT 300. The STT 300 may continue to attempt to communicate its IP address to the DNCS 202 until it receives an acknowledgement.

Software applications running on the PC 150 (FIG. 1) may be allowed to make use of the STT 300's DOCSIS communication channel prior to the UNConfigConfirm message being received by the STT 300, but after a successful registration response has been received from the CMTS 209. However, some of the STT software applications 333 (e.g., a VOD application (not shown)) that depend upon data in the UNConfigConfirm message, risk improper operation if they use the DOCSIS communication channel prior to the UNConfigConfirm message being received. Therefore, the software applications 333 are preferably prohibited from using the DOCSIS communication channel until the STT 300 receives the UNConfigConfirm message. Furthermore, even after a UNConfigConfirm message is received, software applications 333 preferably do not utilize the DOCSIS communications channel for transmitting upstream data unless the UNConfigConfirm message contains a 'success' response from the DNCS 202.

Figure 8:
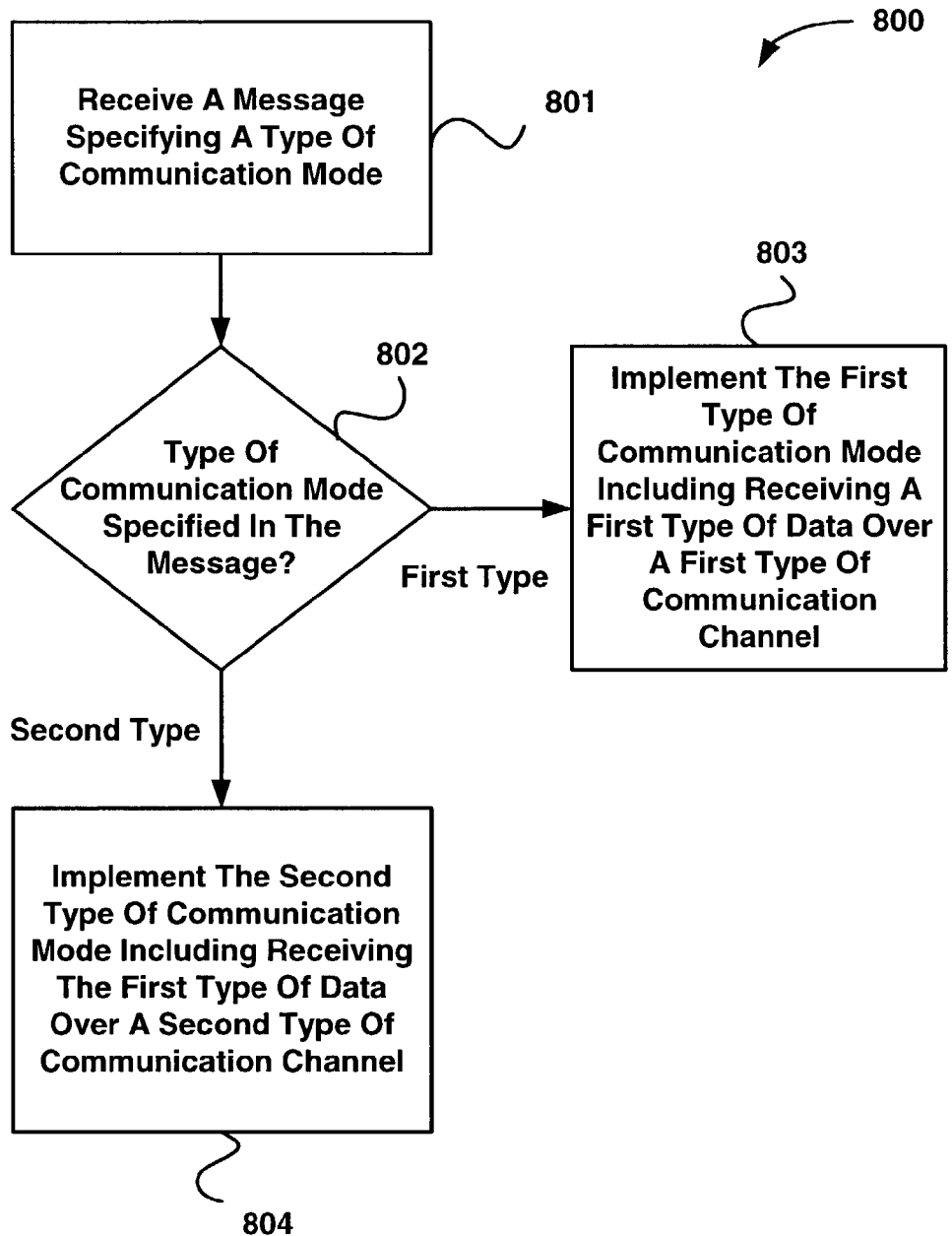
FIG. 8 is a flow chart depicting a method for implementing a communication mode according to one embodiment of the invention.

FIG. 8 is a flow chart depicting a method 800 according to one embodiment of the invention. As indicated in step 801, a message specifying a type of communication mode is received. A determination is then made as to the type of communication mode (e.g., DOCSIS, DAVIC, or MDD, among others) specified in the message, as indicated in step 802. If a first type of communication mode is specified in the message, then the first type of communication mode is implemented in step 803. Implementing the first type of communication mode includes receiving a first type of data (e.g., OOB broadcast data or unicast data) over a first type of communication channel (e.g., a DAVIC or a DOCSIS communication channel). If a second type of communication mode is specified in the message, then the second type of communication mode is implemented in step 804. Implementing the second type of communication mode includes receiving the first type of data over a second type of communication channel.

Figure 9:
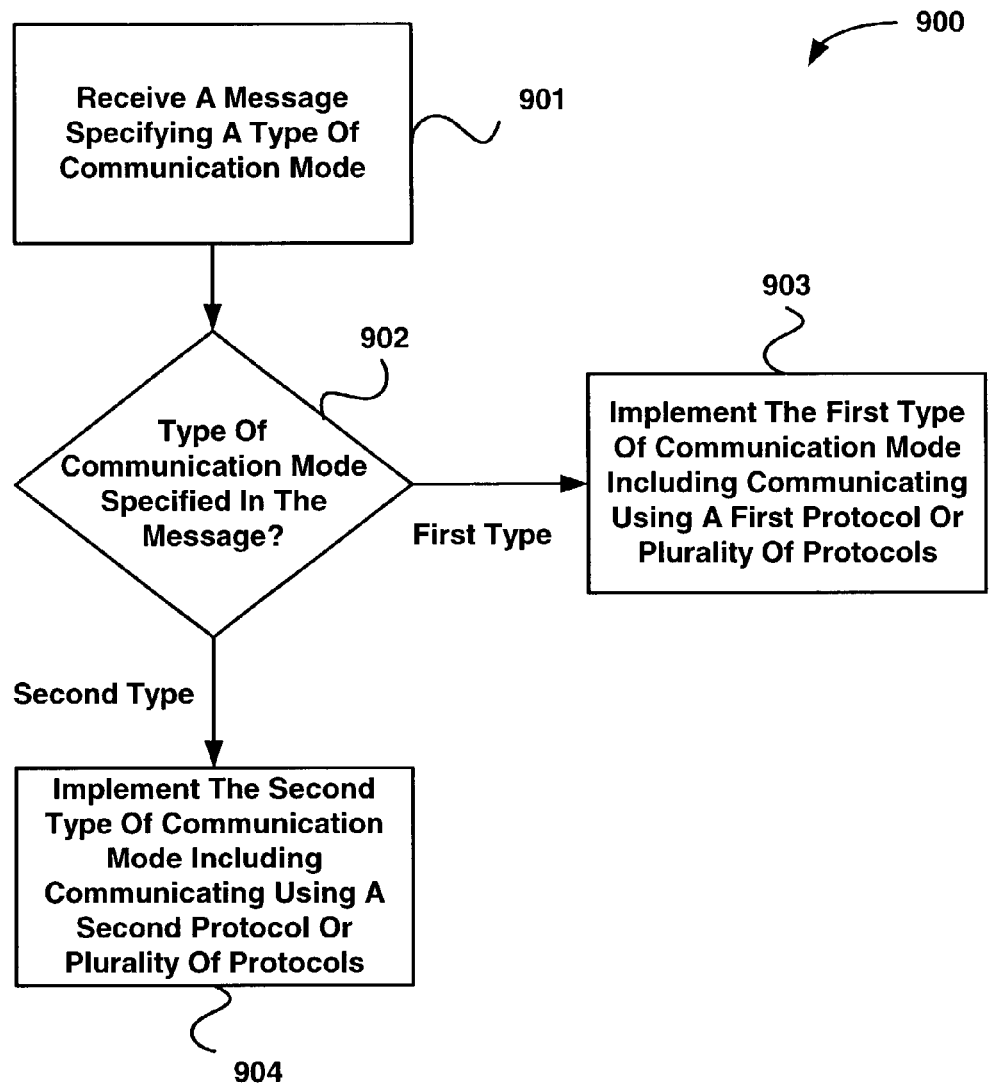
FIG. 9 is a flow chart depicting a method for implementing a communication mode according to one embodiment of the invention.

FIG. 9 is a flow chart depicting a method 900 according to one embodiment of the invention. As indicated in step 901, a message specifying a type of communication mode is received. A determination is then made as to the type of communication mode specified in the message, as indicated in step 902. If a first type of communication mode is specified in the message, then the first type of communication mode is implemented in step 903. Implementing the first type of communication mode includes communicating using a first protocol (e.g., an asynchronous transfer mode (ATM) protocol or an Ethernet protocol, among others) or plurality of protocols. If a second type of communication mode is specified in the message, then the second type of communication mode is implemented in step 904. Implementing the second type of communication mode includes communicating using a second protocol or plurality of protocols.

Figure 10:
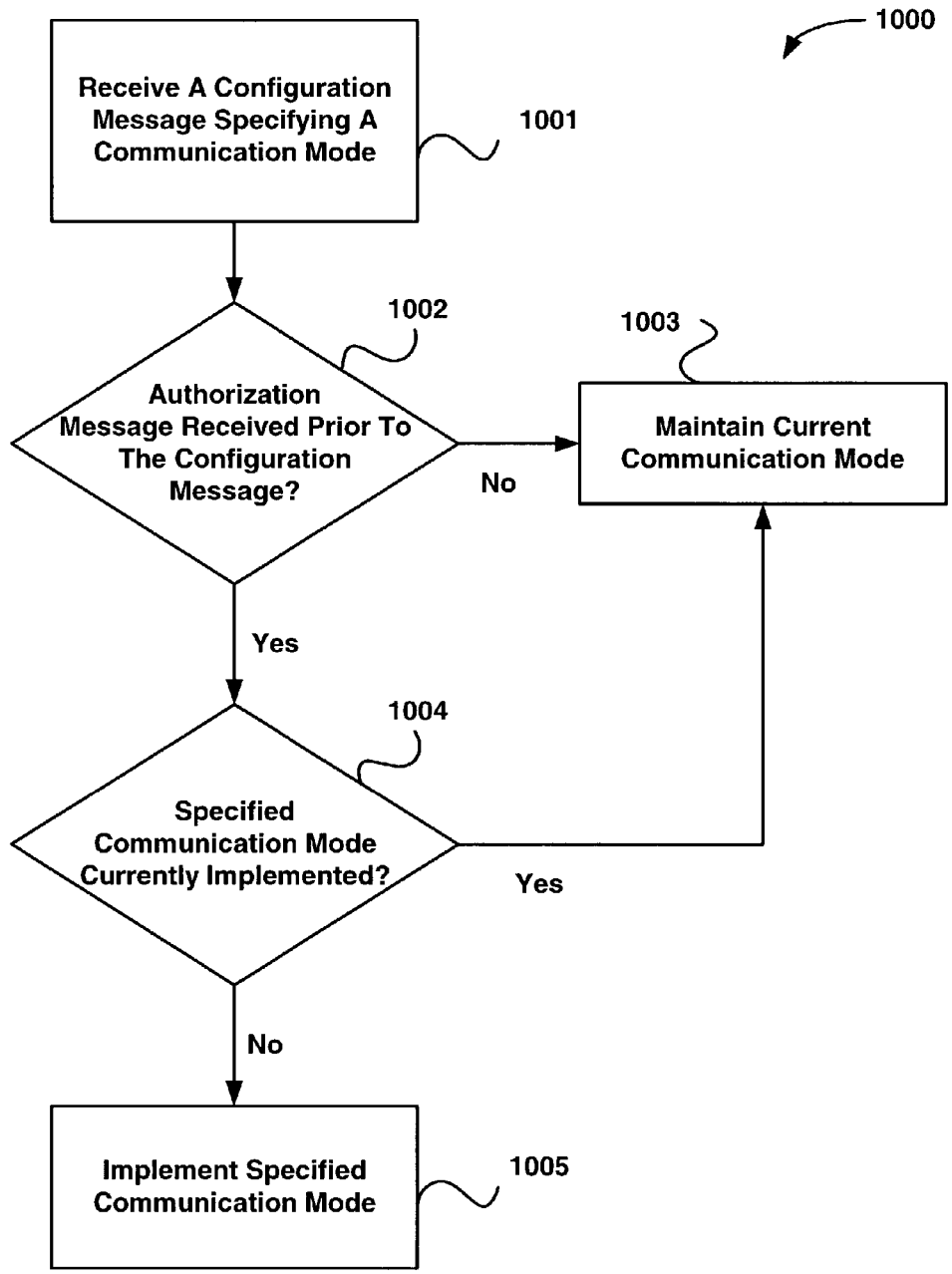
FIG. 10 is a flow chart depicting a method for implementing a communication mode according to one embodiment of the invention.

FIG. 10 is a flow chart depicting a method 1000 according to one embodiment of the invention. As indicated in step 1001, a message (e.g., a UNConfigIndication message) specifying a type of communication mode (e.g., DAVIC, DOCSIS, or MDD, among others) is received. A determination is then made as to whether a certain authorization message was received prior to the configuration message, as indicated in step 1002. If an authorization message was not received prior to the configuration message, then the current communication mode is maintained, as indicated in step 1003. If, however, an authorization message was received prior to the configuration message, then a determination is made as to whether the communication mode that is specified in the configuration message is currently implemented. If the specified communication mode is currently implemented, then the current communication mode is maintained, as indicated in step 1004. If, however, the specified communication mode is not currently implemented, then the specified communication mode is implemented, as indicated in step 1005.

Figure 11:
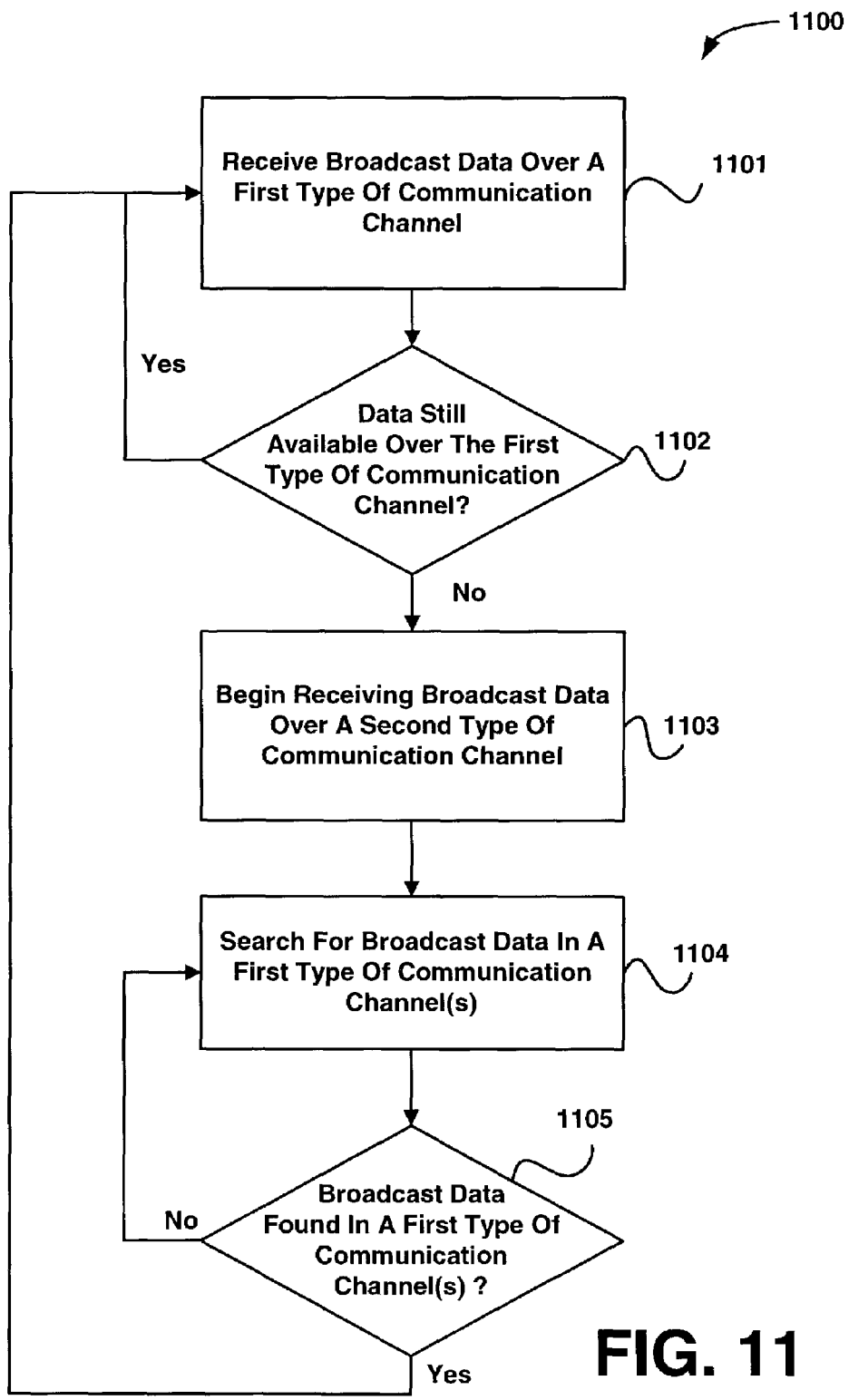
FIG. 11 is a flow chart depicting a method for receiving data according to one embodiment of the invention.

FIG. 11 is a flow chart depicting a method 1100 according to one embodiment of the invention. As indicated in step 1101, broadcast data is received over a first type of communication channel. Then in step 1102, a determination is made as to whether broadcast data is still available over the first type of communication channel.

If broadcast data is still available over the first type of communication channel, then the broadcast data continues to be received over such communication channel, as indicated in step 1101. In other words, broadcast data continues to be received over the first type of communication channel as long as it is still available over such communication channel.

If, however, broadcast data is no longer available over the first type of communication channel, then the broadcast data is received over a second type of communication channel, as indicated in step 1103, and a search is made for broadcast data in one or more first type of communication channel(s), as indicated in step 1104. A determination is then made in step 1105 as to whether broadcast data is found in a first type of communication channel. Receiving the broadcast data over a second type of communication channel may involve, for example, receiving the broadcast data using a different tuner than the tuner that was used to receive the broadcast data over the first type of communication channel.

If broadcast data is not found in a first type of communication channel, then the search for broadcast data continues in step 1104. In other words, the search for broadcast data continues until the broadcast data is found. When broadcast data is found in a first type of communication channel, then the broadcast data is received over the first type of communication channel, as indicated in step 1101.

Figure 12:
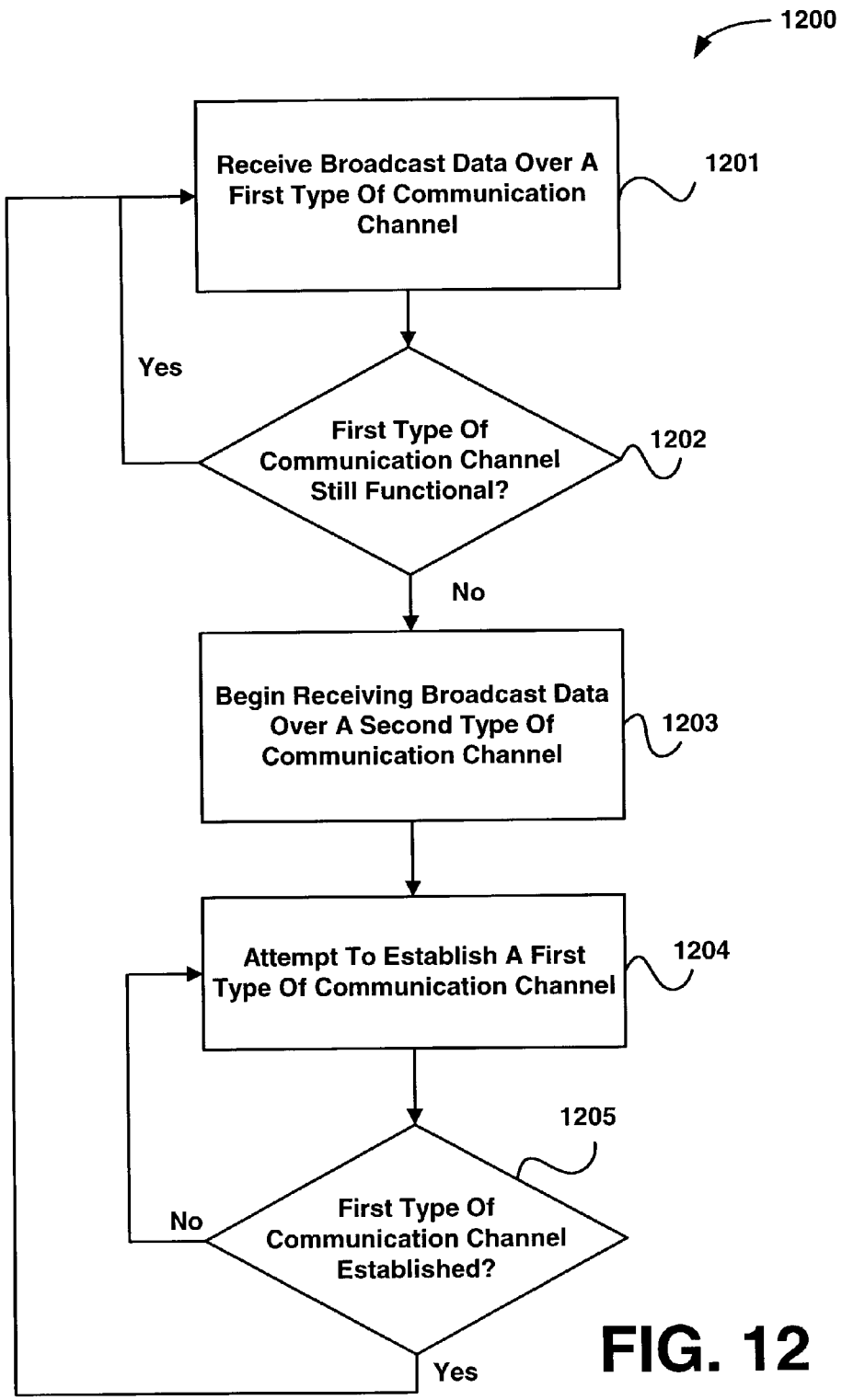
FIG. 12 is a flow chart depicting a method for receiving data according to one embodiment of the invention.

FIG. 12 is a flow chart depicting a method 1200 according to one embodiment of the invention. As indicated in step 1201, broadcast data is received over a first type of communication channel. Then in step 1202, a determination is made as to whether the first type of communication channel is functional.

If the first type of communication channel is functional, then the broadcast data continues to be received over such communication channel, as indicated in step 1201. In other words, broadcast data continues to be received over the first type of communication channel as long as the first type of communication channel is functional.

If, however, the first type of communication channel is not functional (e.g., if no signals are detected over such channel), then the broadcast data is received over a second type of communication channel, as indicated in step 1203, and an attempt is made to establish a first type of communication channel, as indicated in step 1204. A determination is then made in step 1205 as to whether a first type of communication channel has been established.

If a first type of communication channel has not been established, then the attempt to establish a first type of communication channel continues in step 1204. In other words, attempts to establish a first type of communication channel continue until a first type of communication channel is established. When a first type of communication channel is established, then the broadcast data is received over the first type of communication channel, as indicated in step 1201.

The blocks shown in FIGS. 6-12 represent modules, segments, or portions of code which include one or more executable instructions for implementing specific logical functions or steps in a process. In an alternative embodiment, functions or steps depicted in FIGS. 6-12 may be executed out of order from that shown or discussed, including substantially concurrently or in reverse order, depending on the functionality involved, as would be understood by those of ordinary skill in the art.

The functionality provided by the methods illustrated in FIGS. 6-12, can be embodied in any computer-readable medium for use by or in connection with a computer-related system (e.g., an embedded system such as a modem) or method. In this context of this document, a computer-readable medium is an electronic, magnetic, optical, semiconductor, or other physical device or means that can contain or store a computer program or data for use by or in connection with a computer-related system or method. Furthermore, the functionality provided by the methods illustrated in FIGS. 6-12 can be implemented through hardware (e.g., an application specific integrated circuit (ASIC) and supporting circuitry) or a combination of software and hardware.

It should be emphasized that the above-described embodiments of the present invention are merely possible examples, among others, of the implementations, setting forth a clear understanding of the principles of the invention. Many variations and modifications may be made to the above-described embodiments of the invention without departing substantially from the principles of the invention. All such modifications and variations are intended to be included herein within the scope of the disclosure and present invention and protected by the following claims. In addition, the scope of the present invention includes embodying the functionality of the preferred embodiments of the present invention in logic embodied in hardware and/or software-configured mediums.

What is claimed is:

1. A method for implementing a communication mode for a communication terminal, comprising:
    searching a plurality of communication channels to find a UNConfigIndication message, wherein the UNConfigIndication message complies with a Digital Storage Media Command and Control (DSM-CC) protocol;

receiving the message from a remotely located network control system;

responsive to the message specifying a first communication mode, implementing the first communication mode including receiving broadcast data using a first type of communication channel; and responsive to the message specifying a second communication mode, implementing the second mode including receiving unicast data using a second type of communication channel.

2. The method of claim 1, wherein the first type of communication channel is used in accordance with a first communication standard, and the second type of communication channel is used in accordance with a second communication standard.

3. The method of claim 1, wherein the first type of communication channel carries data that is transmitted in accordance with a first communication protocol, and the second type of communication channel carries data that is transmitted in accordance with a second communication protocol.

4. The method of claim 1, wherein the first type of communication channel carries data that is transmitted in a first type of frames, and the second type of communication channel carries data that is transmitted in a second type of frames.

5. The method of claim 1, wherein the communication terminal is a set-top terminal.

6. The method of claim 1, wherein implementing the first communication mode further includes transmitting and receiving the unicast data using the first type of communication channel.

7. A method for implementing a communication mode for a communication terminal, comprising:

searching a plurality of communication channels to find a UNConfigIndication message, wherein the UNConfigIndication message complies with a Digital Storage Media Command and Control (DSM-CC) protocol;

receiving the message from a remotely located network control system;

responsive to the message specifying a first communication mode, implementing the first communication mode including receiving a first type of data using a first type of communication channel; and responsive to the message specifying a second communication mode, implementing the second mode including receiving the first type of data using a second type of communication channel; and transmitting by the network control system a first message to a first plurality of communication terminals that receive the first type of data from a first modem, the first message specifying the first communication mode; and transmitting by the network control system a second message to a second plurality of communication terminals that receive the first type of data from a second modem, the second message specifying the second communication mode.

8. The method of claim 1, further comprising:

responsive to the message specifying a third communication mode, implementing the third communication mode including receiving the first type of data using the first type of communication channel and receiving the second type of data using the second type of communication channel.

9. The method of claim 1, wherein the first type of communication channel involves a first type of modulation scheme, and the second type of communication channel involves a second type of modulation scheme.

10. The method of claim 9, wherein the first type of modulation scheme is quadrature phase shift keying (QPSK) and the second type of modulation scheme is quadrature amplitude modulation (QAM).

11. The method of claim 10, wherein the first type of communication channel is a channel that complies with a DAVIC (Digital Audio-Video Council) protocol and the second type of communication channel is a channel that complies with a DOCSIS (Data Over Cable Service Interface Specification) protocol.

12. A method for implementing a communication mode for a communication terminal, comprising:

receiving a message from a remotely located network control system;

response to the message specifying a first communication mode, implementing the first communication mode including communication with the network control system using a first type of modulation scheme, wherein the first type of modulation scheme is quadrature phase shift keying (QPSK), and wherein implementing the first communication mode includes receiving broadcast data and transmitting and receiving unicast data using the first type of modulation scheme; and responsive to the message specifying a second communication mode, implementing the second communication mode including communicating with the network control system using a second type of modulation scheme, wherein the second type of modulation scheme is quadrature amplitude modulation (QAM).

13. The method of claim 12, wherein implementing the second communication mode includes receiving broadcast data and transmitting and receiving unicast data using the second type of modulation scheme.

14. The method of claim 12, further comprising:

responsive to the message specifying a third communication mode, implementing the third communication mode including communicating with the network control system using the first and second types of modulation scheme.

15. The method of claim 14, wherein implementing the third communication mode includes receiving broadcast data using the first type of modulation scheme.

16. The method of claim 14, wherein implementing the third communication includes transmitting and receiving unicast data using the second type of modulation scheme.

17. A method for implementing a communication mode for a communication terminal, comprising:

receiving a message from a remotely located network control system;

responsive to the message specifying a first communication mode, implementing the first communication mode including:

communicating with a first type of modem to help establish a first type of interactive connection;

transmitting a request message to a session and resource manager (SRM) requesting an IP address; and receiving a confirm message from the SRM identifying an IP address; and responsive to the message specifying a second communication mode, implementing the second communication mode including:

communicating with the second type of modem to help establish a second type of interactive connection;

communication with a server to obtain an IP address;

transmitting the request message to the SRM to inform the SRM of the IP address; and receiving the confirm message from the SRM providing permission to use the IP address.

18. The method of claim 17, wherein the first communication mode is a Digital Audio-Visual Council (DAVIC) mode, wherein the first type of modem is a quadrature phase shift keying (QPSK) modem, and wherein the first type of interactive connection is a DAVIC interactive connection.

19. The method of claim 17, wherein the second communication mode is a Data Over Cable Service Interface Specification (DOCSIS) mode, wherein the second type of modem is a cable modem termination system (CMTS) modem, and wherein the second type of interactive connection is a DOCSIS connection.

20. The method of claim 17, wherein the server is a dynamic host control protocol (DHCP) server.

21. A method for implementing a communication mode for a communication terminal, comprising:

receiving a UNConfigIdentification message from a digital network control system (DNCS);

responsive to the UNConfigIndication message specifying a Digital Audio-Visual Council (DAVIS) communication mode, implementing the DAVIC communication mode including receiving broadcast data and transmitting and receiving unicast data using a DAVIC communication channel; and responsive to the UNConfigIndication message specifying a Data Over Cable Service Interface Specification (DOCSIS) communication mode, implementing the DOCSIS communication mode including receiving broadcast data and transmitting and receiving unicast data using a DOCSIS communication channel; and responsive to the UNConfigIndication message specifying a mixed DOCSIS/DAVIC (MDD) communication mode, implementing the MDD communication mode including receiving broadcast data using the DAVIC communication channel and transmitting and receiving unicast data using the DOCSIS communication channel.

* * * * *